(12) United States Patent
Jerman et al.

(10) Patent No.: US 6,882,083 B2
(45) Date of Patent: Apr. 19, 2005

(54) MINIATURE DEVICE WITH BOSSED SUSPENSION MEMBER

(75) Inventors: John H. Jerman, Palo Alto, CA (US); John D. Grade, Mountain View, CA (US)

(73) Assignee: IOLON, Inc., San Jose, CA (US)

( * ) Notice: Subject to any disclaimer, the term of this patent is extended or adjusted under 35 U.S.C. 154(b) by 47 days.

(21) Appl. No.: 10/100,545

(22) Filed: Mar. 14, 2002

(65) Prior Publication Data

US 2002/0149293 A1 Oct. 17, 2002

Related U.S. Application Data

(60) Provisional application No. 60/275,957, filed on Mar. 14, 2001.

(51) Int. Cl.[7] .................................................. H02N 1/00
(52) U.S. Cl. ........................ 310/309; 310/12; 73/504.12
(58) Field of Search ..................... 310/12, 309; 385/13, 385/16, 18; 360/294.5; 257/420; 359/223, 292; 73/504.12, 32

(56) References Cited

U.S. PATENT DOCUMENTS

| | | | | |
|---|---|---|---|---|
| 5,998,906 A | * | 12/1999 | Jerman et al. | 310/309 |
| 6,301,403 B1 | * | 10/2001 | Heanue et al. | 385/18 |
| 6,469,415 B1 | * | 10/2002 | Jerman et al. | 310/309 |
| 6,541,892 B1 | * | 4/2003 | Hoen | 310/309 |
| 6,552,839 B1 | * | 4/2003 | Hong et al. | 359/290 |
| 6,625,101 B1 | | 9/2003 | Jerman et al. | |

OTHER PUBLICATIONS

Hein, Schlichting, Obermeier, "Piezoresistive Silicon Sensor For Very Low Pressures Based on the Concept Of Stress Concentration", Technical University of Berlin, pp. 628–631.

Henein, Bottinelli, Clavel, "Parallel Spring Stages with Flexures Of Micrometric Cross–Sections", Swiss Federal Institute of Technology of Lausanne, pp. 209–220, SPIE vol. 3202.

Legtenberg, Groeneveld, Elwenspoek, Comb–drive Actuators for large Displacements, MESA Research Institute, University of Twente, pp. 320–329.

* cited by examiner

Primary Examiner—Darren Schuberg
Assistant Examiner—J. Aguirrechea
(74) Attorney, Agent, or Firm—Dorsey & Whitney LLP

(57) ABSTRACT

A miniature device comprising a substrate, a movable member overlying the substrate and first and second spaced-apart suspension members. Each of the first and second suspension members has a first bendable end portion coupled to the substrate and a second bendable end portion coupled to the movable member and a substantially rigid central portion. The first and second end portions of each suspension member have respective first and second lengths and the suspension member has an overall length. The sum of the first and second lengths of each suspension member ranges from 5% to 40% of the overall length of the suspension member.

18 Claims, 5 Drawing Sheets

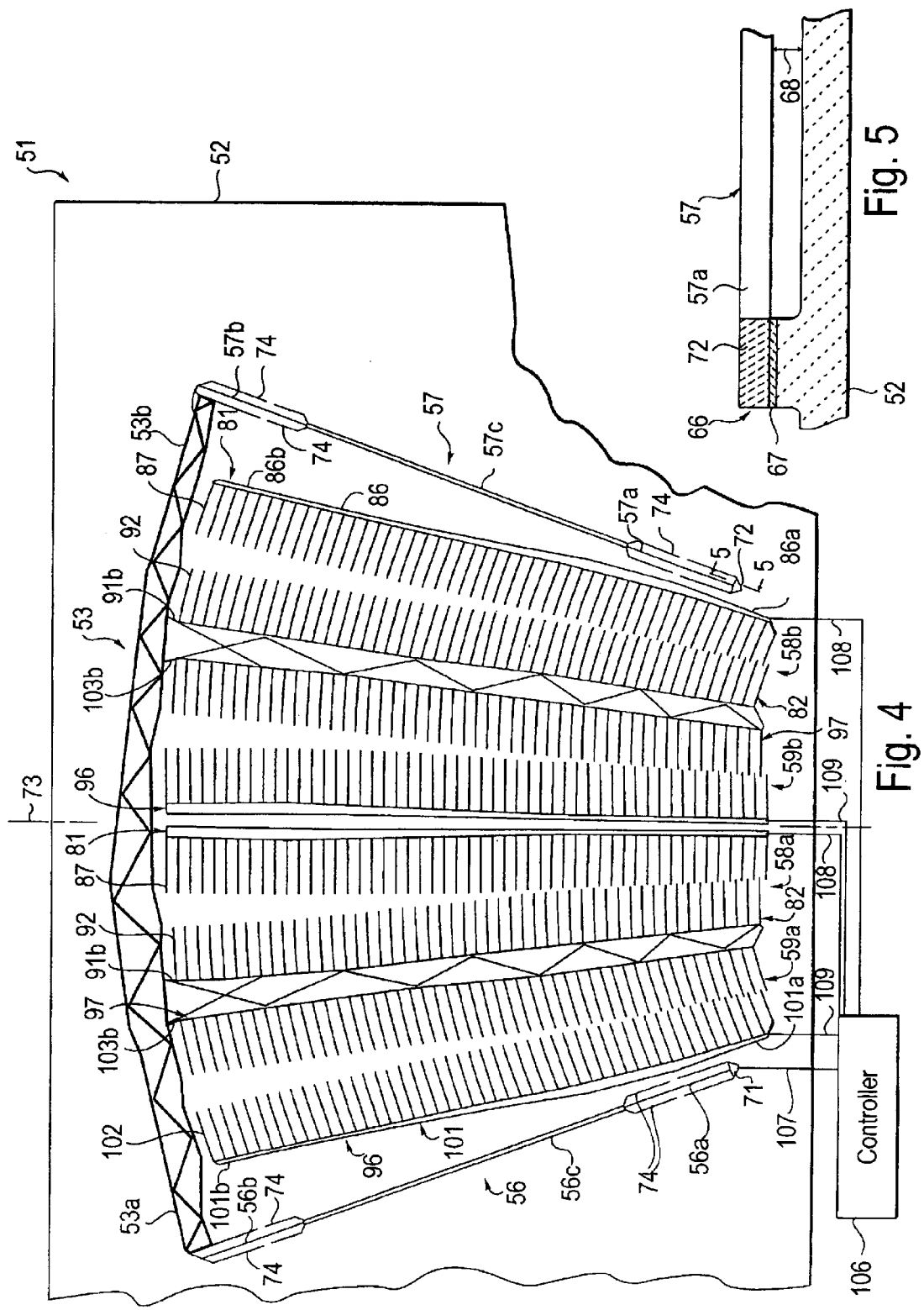

MINIATURE DEVICE WITH BOSSED SUSPENSION MEMBER

CROSS-REFERENCE TO RELATED APPLICATION

The application claims priority to U.S. provisional patent application Ser. No. 60/275,957 filed Mar. 14, 2001, the entire content of which is incorporated herein by this reference.

FIELD OF THE INVENTION

The present invention relates generally to miniature devices and more particularly to miniature devices having suspension members.

BACKGROUND

A summary of traditional electrostatic microactuator design techniques is given by Legtenberg, Groeneveld and Elwenspoek in their paper "Comb-drive actuators for large displacements", J. Micromech. Microeng., 1996. Unfortunately, the features described therein do not have adequate side-stiffness for increased deflection.

Miniature devices, such as micromechanical or micromachined devices, having movable members supported above a substrate by one or more suspension members have been disclosed. See, for example, U.S. Pat. No. 5,998,906 which discloses a linear microactuator for translating a mirror in and out of a beam of light in an optical disk drive system. The suspension members disclosed therein have a constant width along the length thereof.

The use of notched flexures for high precision macroscopic mechanisms is known. Such flexures often consist of a pair of semi-circular notches removed from a relatively thick beam such that the beam appears to rotate about a pivot point approximately at the center of the notches. See, for example, "Parallel spring stages with flexures of micrometric cross-section" by Henin, Bottinelli and Clavel, SPIE Vol. 3202, 1998, pp 209–219. Unfortunately, notched flexures are quite stiff due to the limited amount of material subject to bending in the notch region. Additionally, since all of the strain in the flexure is localized, the maximum angular deflection of such a flexure is limited by the maximum strain which the material can tolerate without failure. As a result, these flexures are typically used in small deflection instrumentation applications where substantial actuation force is available from electromagnetic or piezoelectric actuators. The difficulty in maintaining the required width tolerance of the hinge during the fabrication of these devices has additionally made them expensive to manufacture and limited their use.

The use of bossed diaphragms is known in the design and fabrication of piezoresistive pressure sensors. See in this regard "Piezoresistive silicon sensor for very low pressures based on the concept of stress concentration" by Hein, Schlichting, and Obermeier, Technical Digest of the $7^{th}$ International conference on Solid-State Sensors and Actuators, Yokomaha, June, 1993, pp 628–631. The goal of such diaphragms, however, is to enhance the measuring of small pressure differences.

In general, it is an object of the present invention to provide a miniature device having a suspension member for supporting a movable member over a substrate.

Another object of the invention is to provide a miniature device of the above character in which the suspension has a high compliance in the desired direction of motion.

Another object of the invention is to provide a miniature device of the above character in which the suspension member has a high side stiffness.

Another object of the invention is to provide a miniature device of the above character in which the suspension member has a minimal device area.

Another object of the invention is to provide a miniature device of the above character capable of translating an optical element.

SUMMARY OF THE INVENTION

A miniature device comprising a substrate, a movable member overlying the substrate and first and second spaced-apart suspension members is provided. Each of the first and second suspension members has a first bendable end portion coupled to the substrate and a second bendable end portion coupled to the movable member and a substantially rigid central portion. The first and second end portions of each suspension member have respective first and second lengths and the suspension member has an overall length. The sum of the first and second lengths of each suspension member ranges from 5% to 40% of the overall length of the suspension member.

BRIEF DESCRIPTION OF THE DRAWINGS

The accompanying drawings, which are somewhat schematic in some instances and are incorporated in and form a part of this specification, illustrate several embodiments of the invention and, together with the description, serve to explain the principles of the invention.

FIG. 4 is a plan view of another embodiment of a miniature device with bossed suspension member in a first position.

FIG. 5 is a cross-sectional view of the miniature device of FIG. 4 taken along the line 5—5 of FIG.4.

DESCRIPTION OF THE INVENTION

Figure 1:
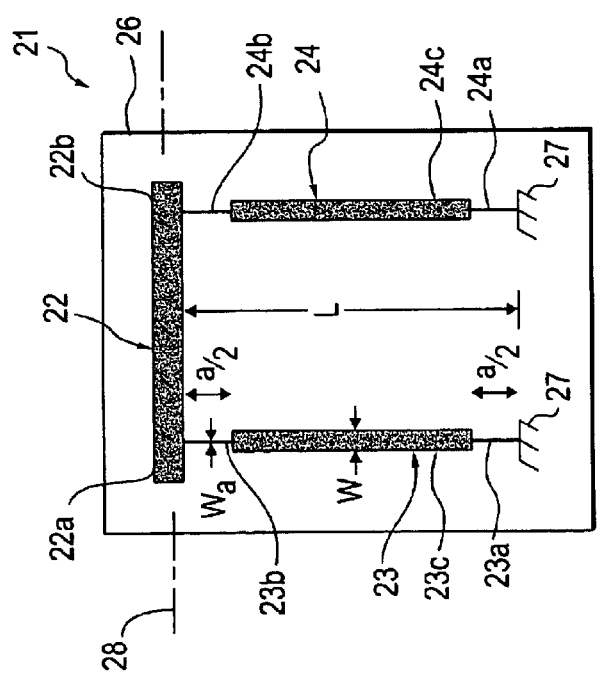
FIG. 1 is a plan view of a miniature device with bossed suspension member of the present invention.

One embodiment of the miniature device with bossed suspension member of the present invention is shown schematically in FIG. 1. Miniature device 21 shown therein includes a movable or translatable member 22 and first and second suspension members 23 and 24 overlying a substrate 26. Miniature device 2 can be part of an actuator, sensor, accelerometer or any other device having a movable member suspended over a substrate. One miniature device having such a movable member is disclosed in U.S. Pat. No. 5,998,906, wherein a micromachined linear electrostatic actuator having a translatable member disclosed. Another exemplary miniature device having such a movable member is disclosed in U.S. patent application Ser. No. 09/547,698 filed Apr. 12, 2000, now U.S. Pat. No. 6,384,510, the entire content of which is incorporated herein by this reference.

Substrate 26 is made for any suitable material such as silicon and is preferably formed from a silicon wafer. The substrate can be of any suitable size. In one embodiment, the substrate 26 has a length ranging from 500 to 5000 microns and preferably approximately 2000 microns and a width ranging from 500 to 5000 microns and preferably approximately 2000 microns.

Translatable member 22 can be flexible or rigid and is preferably an elongate rigid member having first and second portions or extremities 22a and 22b. First and second spaced-apart suspension members 23 and 24 serve to couple translatable member 22 to the substrate 26. In this regard, first suspension member has a first end portion coupled to substrate 26 by means of an anchor 27 joined to the substrate and a second end portion 23b coupled to first extremity 22a of the translatable member 22. First suspension member 23 further includes a central portion or boss 23c intermediate first and second end portions 23a and 23b. Second suspension member 24 is similar in construction to the first suspension member and includes a first end portion 24a coupled to substrate 26 by means of an anchor 27 and a second end portion 24b coupled to second extremity 22b of the translatable member. A central portion or boss 24c is intermediate the first and second end portions 24a and 24b of the second suspension member 24. The first and second end portions of each of the suspension members 23 and 24 are bendable or flexible and the central portion of each of the suspension members is substantially rigid.

The spaced-apart first and second suspension members 23 and 24 preferably have an equal length L and extend parallel to each other. The length L of each suspension member 23 and 24 can range from 100 to 3000 microns and is preferably approximately 1200 microns. The first and second end portions of each suspension member have respective first and second lengths, shown in FIG. 1 with respect to first suspension member 23 as being a/2. The sum of such first and second lengths is thus sublength a in FIG. 1. In one embodiment, sublength a ranges from 5% to 40% of overall length L of the suspension member, preferably ranges from 15% to 30% of overall L and more preferably is approximately 20% of overall L. The central portion of each of suspension members 23 and 24 is preferably centered on the length of the suspension member so that the point of zero bending of the suspension member is at the midlength portion of the central portion and the suspension member.

The first and second end portions of each suspension members 23 and 24 have respective first and second widths and preferably each have a width $w_a$, as shown in FIG. 1 with respect to the second end portion of first suspension member 23, ranging from one to ten microns and preferably approximately four microns. The rigid central portion of each suspension member has a width that is greater than width $w_a$. Such central portion width can be constant or can vary over the length of the central portion. The central portion of each suspension member 23 and 24 preferably has a width W ranging from 10 to 100 microns and preferably approximately 20 microns. A suspension member disclosed herein having a central portion with a width greater than the width of the first and second end portions of the suspension member is sometimes referred to herein as a bossed suspension member.

Translatable member and first and second suspension members 23 and 24 are formed in any suitable manner and are preferably formed using deep reactive ion etching (DRIE) techniques or the Lithographie Gavanometrie and Abformung (LIGA) process from a top layer or wafer (not shown) joined to substrate 26 by any suitable means. Such DRIE techniques or LIGA process permit the etching of features with a high aspect ratio of about 20:1, that is they have a depth that is 20 times greater than the width of a feature so as to have a high degree of stiffness out of the plane of substrate 26.

In operation and use, first and second suspension members 23 and 24 permit translatable member 22 to move in forward and rearward linear directions substantially along line 28 in FIG. 1. More specifically, translatable member 22 can be moved in a first or forward direction from its rest position of FIG. 1, that is in a direction to the right in FIG. 1, to a first translated or forward position (not shown). Translatable member 22 can also be moved in an opposite second or rearward direction substantially along line 28, that is to the left in FIG. 1, to a second translated or rearward position (not shown).

The bendable first and second end portions of suspension members 23 and 24 permit the suspension members to bend relative to anchors 27 and thus substrate 26 so as to allow such movement of translatable member 22. However, as translatable member 22 moves from its rest position to either of its forward or rearward actuated positions, there is a small parasitic motion in the direction perpendicular to the primary translation caused by first and second suspension members 23 and 24 remaining essentially the same length as they are bent. When used herein, the forward stiffness of suspension members 23 and 24 refers to the stiffness in the direction of translation of member 22 and the side stiffness of the suspension members refers to the stiffness in the direction perpendicular to such translation direction.

The substantially rigid central portion of first and second suspension members 23 and 24 causes the parasitic side motion of such suspension members to be advantageously smaller than the parasitic side motion in a suspension member having a constant width over the length of the suspension member. The optimal values for the boss ratio L/a, that is the ratio of length L to the sublength a, and the width ratio $W/w_a$, that is the ratio of the width W of the central portion to the width $w_a$ of the end portions, depend on the requirements of the particular application of miniature device 21. Known mathematics reveal that the forward or bending stiffness of suspension members 23 and 24 is a function of the cube of the width of the suspension member. Hence, for example, where the width of the central portion of a suspension member is three times the width of the end portions of such suspension member, the width ratio $W/w_a$ equals three and the bending stiffness of the central portion is almost ten times greater than the bending stiffness of the end portions.

Figure 2:
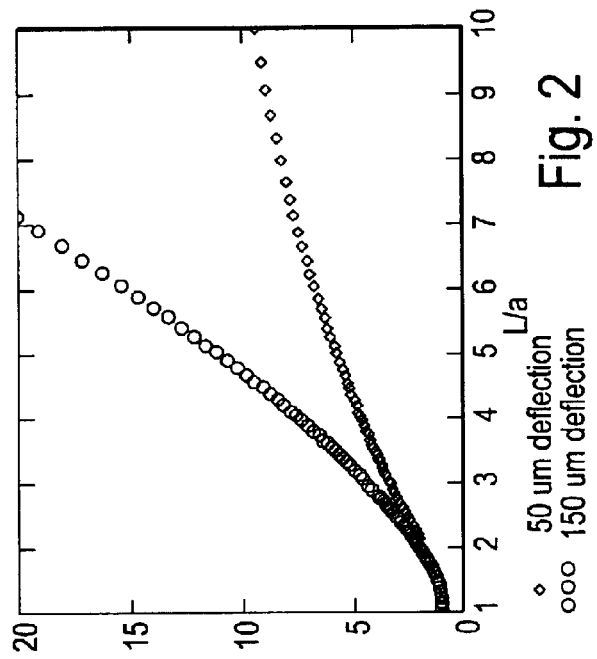
FIG. 2 is a graph showing the ratio of side stiffness for a bossed suspension member over a constant width suspension member as a function of the boss ratio of the bossed suspension member for the miniature device of FIG. 1.
Figure 3:
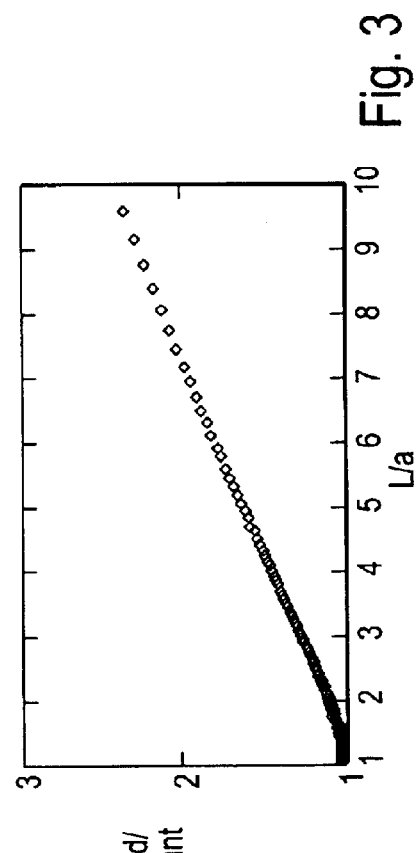
FIG. 3 is a graph showing the ratio of stress for a bossed suspension member over a constant width suspension member as a function of the boss ratio of the bossed suspension member for the miniature device of FIG. 1.

FIG. 2 compares the increase in side stiffness for a single bossed suspension member such as bossed member 23 or 24 over a single constant width suspension member of equal length and forward stiffness, that is the ratio of the side stiffness of such bossed suspension member over the side stiffness of a constant width suspension member, for different boss ratios and different forward deflections ranges of the bossed suspension member and thus translatable member 22. FIG. 3 compares the increase in stress for a single bossed suspension member such as bossed member 23 or 24 over a single constant width suspension member, that is the ratio of the stress experienced by such bossed suspension member over the stress experienced by a constant width suspension member, for different boss ratios and different forward deflections ranges of the bossed suspension member and thus the translatable member.

The constant width suspension member utilized for the comparisons of FIGS. 2 and 3 has a constant width of five microns, a length of 1200 microns and a forward stiffness of 0.3 N/m. Hence, $w_a=W=5$ microns and L=1200 microns. The constant width of such suspension member dictates that $W/w_a=L/a=1$. The bossed suspension member utilized in the comparisons of FIGS. 2 and 3 is similarly dimensioned except that width W equals 12 microns and width $w_a$ equals four microns. The width ratio $W/w_a$ of such bossed suspension member is thus equal to three. These dimensions were chosen so that for purposes of comparison in FIGS. 2 and 3 the forward stiffness of such constant width suspension member is equivalent to the forward stiffness of such bossed suspension member. As noted above, a width ratio $W/w_a$ of three provides the central portion of the suspension member with almost ten times the forward or bending stiffness of the end portions of the suspension member, thus making the bending of the central portion relative to the end portions negligible.

FIG. 3 shows that a bossed suspension member having a boss ratio of five experiences 60% more stress than a constant width suspension. FIG. 2 shows, however, that the side stiffness of such a bossed suspension member is improved by a factor of 5.5 after a 50 micron forward deflection and improved by a factor of 11 after a 150 micron forward deflection. Since the maximum forward deflection of a suspension member is approximately proportional to the square root of the ratio of the side stiffness to the forward stiffness of such suspension member, the bossed suspension member with the dimensions set forth above can provide a threefold increase in forward deflection over a constant width suspension member of equal length. It can be seen from FIG. 2 that the boss ratio L/a determines the improvement in the side stiffness. A large boss ratio provides increased resistance to both compression and buckling. The increase in side stiffness of the linear suspension member increases the translational range of translatable member 22 by inhibiting bending of the suspension members in a direction perpendicular to line 28 and thus motion of translatable member 22 along such line.

The bending in a bossed suspension member is concentrated in the narrow portions at the ends of the suspension beam, which can lead to increased stress in the beam. It is thus preferable that the boss ratio be chosen such that the maximum stress experienced by such suspension member satisfies the failure criteria for the material, for example, $stress_{max}<\sim 2$ GPa for silicon.

Another embodiment of the miniature device with bossed suspension member of the present invention is shown in FIGS. 4–7. Miniature device 51 is a motor and, more specifically, an electrostatic microactuator. Device or rotatable electrostatic microactuator 51 disclosed in FIGS. 4–7 is formed on a planar substrate 52 (see FIGS. 4 and 5). The microactuator 51 includes a movable member 53 suspended above substrate 52 by first and second suspension members 56 and 57. A plurality of first comb drive assemblies 58a and 58b are carried by substrate 52 for rotating or pivoting movable member 53 in a clockwise direction about an axis of rotation (not shown) extending perpendicular to substrate 52. In general, such axis of rotation is located at the intersection of radial lines extending coincident with the at rest first and second suspension members 56 and 57 shown in FIG. 4. A plurality of second comb drive assemblies 59a and 59b are carried by the substrate 52 for rotating or pivoting movable member 53 in a counterclockwise direction about such axis of rotation.

Substrate 52 is substantially similar in construction and composition to substrate 26 and has a thickness similar to the thickness of substrate 26. Movable member 53, first and second suspension members 56 and 57 and first and second comb drive assemblies 58 and 59 are formed atop the substrate 52 by a second or top layer 66 made from a wafer of any suitable material such as silicon (see FIG. 5). Top layer or wafer 66 has a thickness ranging from 10 to 200 microns and preferably approximately 85 microns and is secured at certain points to the substrate 52 by any suitable means. In one preferred embodiment, top wafer 66 is fusion bonded to substrate 52 by a silicon dioxide layer 67 having a thickness ranging from 0.1 to two microns and preferably approximately one micron.

Movable member 53, first and second suspension members 56 and 57 and first and second comb drive assemblies 58 and 59 are formed from top wafer 66 by any suitable means, and preferably etched from the wafer using DRIE techniques or the LIGA process so as to have a high aspect ratio and a high out-of-plane stiffness as discussed above with respect to miniature device 21. Movable member 23, first and second suspension members 56 and 57 and the movable portions of first and second comb drive assemblies 58 and 59 have a thickness approximating the thickness of top wafer 66 and are suspended above the substrate 52 by a gap 68, shown in FIG. 5, that ranges from one to 30 microns so as to be electrically isolated from the substrate 52.

Figure 6:
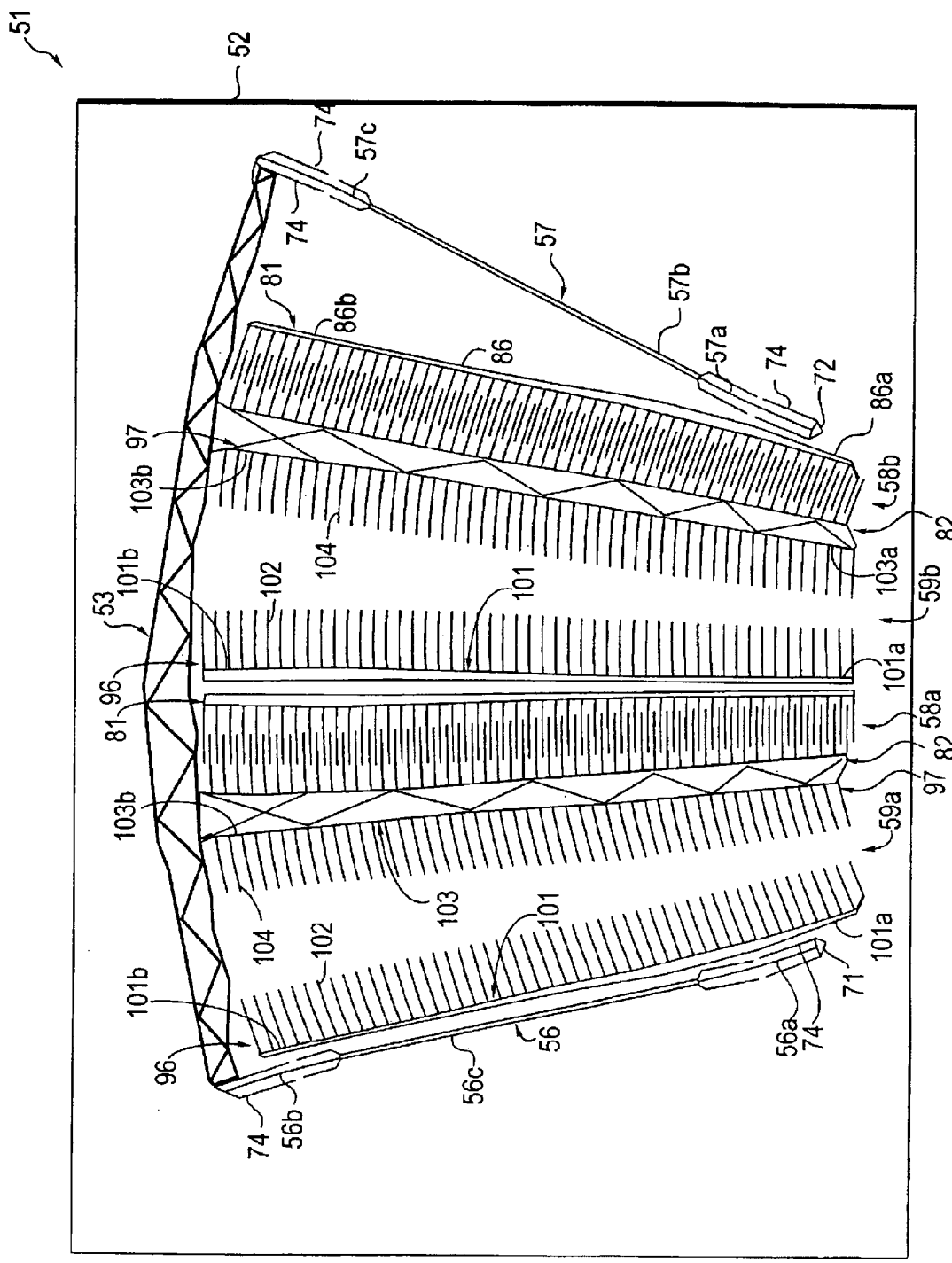
FIG. 6 is a plan view of the miniature device of FIG. 4 in a second position.
Figure 7:
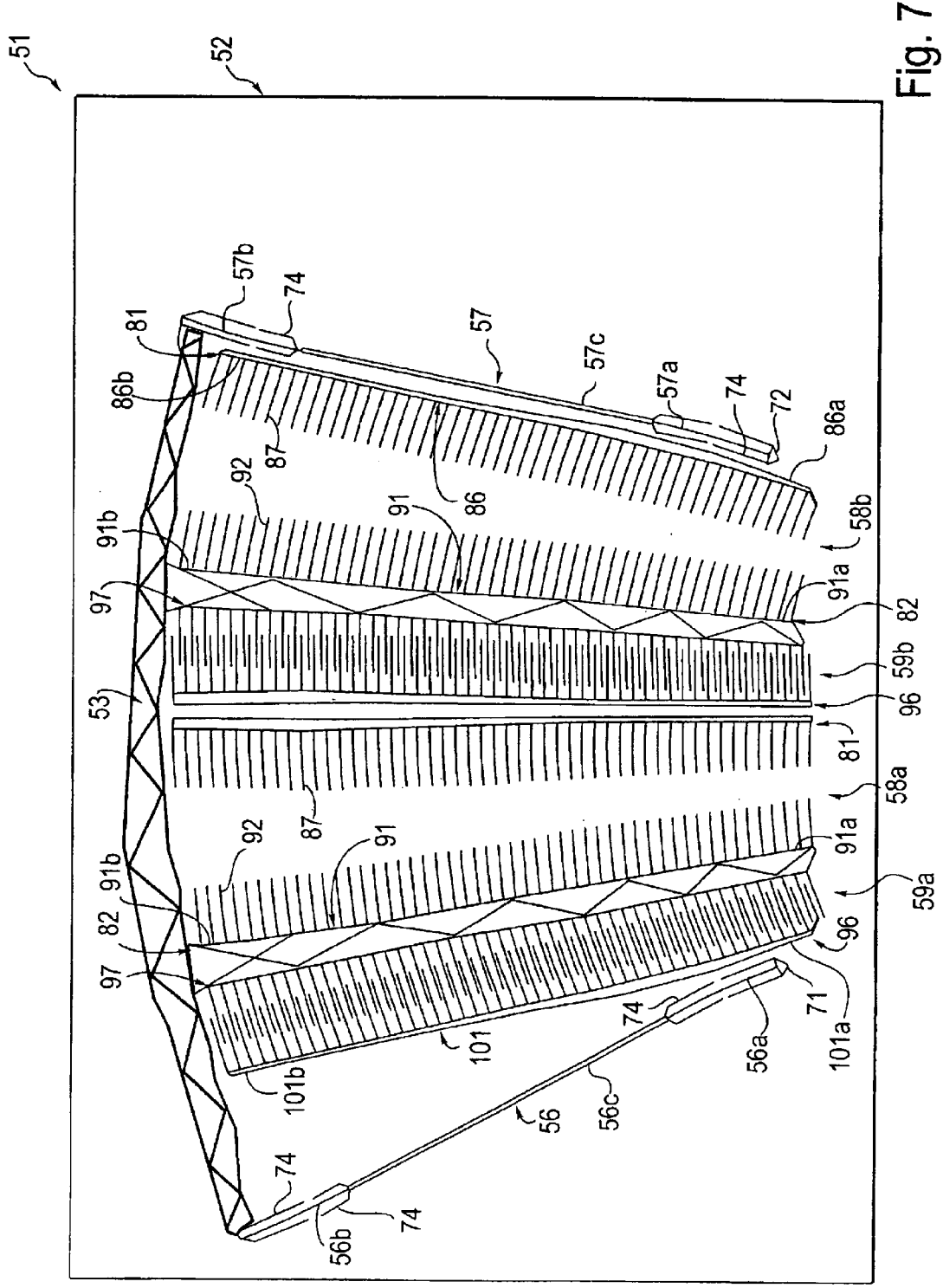
FIG. 7 is a plan view of the miniature device of FIG. 4 in a third position.

Movable member 53 is substantially rigid and has first and second extremities 53a and 53b (see FIGS. 4, 6 and 7). First and second spaced-apart suspension members 56 and 57 are substantially similar in construction to first and second suspension members 23 and 24 discussed above. Specifically, first suspension member 56 has flexible or bendable first and second end portions 53a and 53b and a substantially rigid central portion or boss 56c. First end portion 56a is coupled to substrate 52 by a first anchor 71, formed from top wafer 66 and rigidly joined to substrate 52. Second end portion 56b is coupled to first extremity 53a of the movable member 53. Second suspension member 57 has flexible or bendable first and second end portions 57a and 57b and a substantially rigid central portion or boss 57c intermediate the end portions 57a and 57b. First end portion 57a is coupled to substrate 52 by a second anchor 72 formed from top wafer 66 and rigidly attached to the substrate 52. Second end portion 57b is coupled to second extremity 53b of the movable member 53. Each of the suspension members 56 and 57 extends radially outwardly when in its rest position, shown in FIG. 4. The suspension members are preferably symmetrically disposed about a radial centerline 73 of microactuator 51 when in their rest positions shown in FIG. 4. A line extending along the suspensions members as positioned in FIG. 4 intersects radial centerline 73 at the axis of rotation of microactuator 51. Sacrificial bars or beams 74 of the type described in U.S. Pat. No. 5,998,906 can optional extend along either of both sides of the end portions of suspension members 56 and 57 for ensuring even etching and thus the desired cross section of such portions of suspension members (see FIG. 4).

First and second suspension members 56 and 57 can have any suitable dimensions. As discussed above, the suspension members 56 and 57 have a thickness, that is a dimension perpendicular to the plane of substrate 52, equal to the thickness of top wafer 66. First and second suspension members 56 and 57 preferably have an equal length that can range from 500 to 5000 microns and is preferably approximately 1500 microns. The first and second end portions of each suspension member 56 and 57 have respective first and second lengths and have an aggregate sublength a. The lengths and widths of the various portions of first and second suspension members 56 and 57 are identified in FIG. 8, where a schematic view of a portion of microactuator 51 is shown in its rest position of FIG. 4. In one preferred embodiment, each such end portion has a respective length a/2. First and second suspension members 56 and 57 preferably have a rectangular cross section. In this regard, the first and second end portions of each of the suspension members 56 and 57 have a constant width $w_a$ over the irrespective lengths, as identified in FIG. 8 with respect to second end portion 56b. The central portion of each of the suspension members has a constant width W over its length, as identified in FIG. 8 with respect to central portion 56c. More specifically, the end portions of each suspension member 56 and 57 can have a width $w_a$ ranging from one to ten microns and preferably approximately four microns. The central portion of each suspension member 56 and 57 is wider than the respective end portions of such suspension member and has a width W ranging from 10 to 100 microns and preferably approximately 20 microns.

Figure 8:
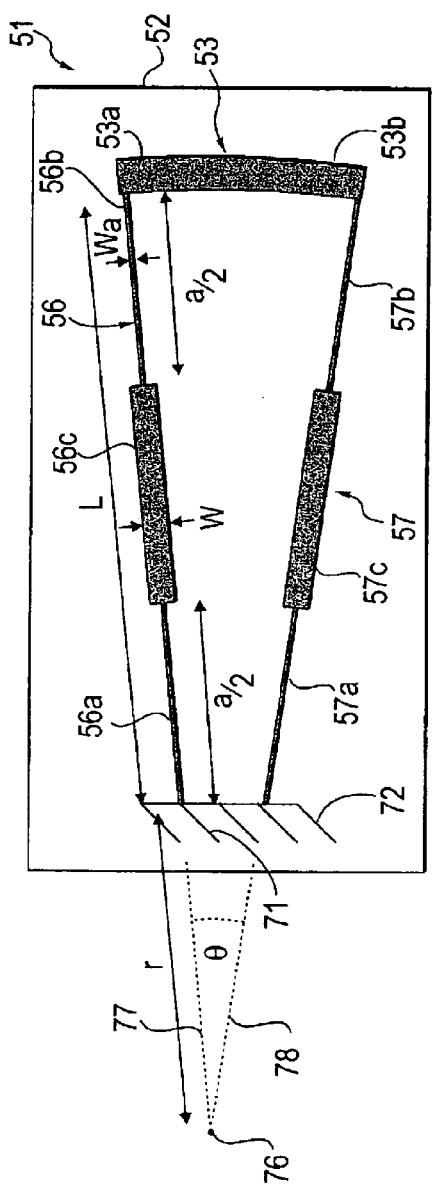
FIG. 8 is a schematic view of a portion of the miniature device of FIG. 4.

Axis of rotation 76 of microactuator 51 is shown in FIG. 8 and, as noted above, is located at the intersection of first and second radial lines 77 and 78 extending respectively along the first and second suspension members 56 and 57 and is outside the confines of microactuator 51 and substrate 52 thereof. The axis of rotation 76 is a distance r from the base of each of the first and second suspension members 56 and 57, that is the location where the suspension members 56 and 57 join respective anchors 71 and 72. Angle θ in FIG. 8 is the separation angle of radial lines 77 and 78 as well as the separation angle of first and second suspension members 56 and 57.

First and second comb drive assemblies 58 and 59 are disposed between first and second suspension members 56 and 57 (see FIGS. 4, 6 and 7). However, it should be appreciated that one or more of the first and second comb drive assemblies 58 and 59 can be disposed outside of the suspension members 56 and 57, that is not between the suspension members, and in certain embodiments all of the comb drive assemblies 58 and 59 can be disposed outside of the suspension members and be within the scope of the present invention.

First and second comb drive assemblies 58 and 59 are substantially similar in construction and each have a length approximating the length of first and second suspension members 56 and 57 (see FIGS. 4, 6 and 7). More specifically, each of the first comb drive assemblies 58a and 58b includes a first drive member or comb drive 81 mounted on substrate 52 and a second comb drive member or comb drive 82 overlying the substrate. The first or stationary comb drive 81 of each of first comb drive assemblies 58a and 58b has a radially-extending truss or bar 86 having an opposite first and second end portion 86a and 86b. A plurality of first comb drive fingers or stationary comb fingers 87 extend from one side of bar 86 in radially-apart positions along the length of the bar. Movable comb drive 82 of each of the first comb drive assemblies 58a and 58b is spaced above substrate 52 so as to be movable relative to the substrate and the respective stationary comb drive 81. Second or movable comb drive 82 has a construction similar to the stationary comb drive 81 and, more specifically, is formed with a radially-extending truss or bar 91 having opposite first and second end portions 91a and 91b. A plurality of second comb drive fingers or movable comb fingers 92 extend from one side of bar 91 in radially-apart positions along the length of the bar.

Each of the second comb drive assemblies 59a and 59b has a first or stationary comb drive 96 mounted on substrate 52 and a second or movable comb drive 97 overlying the substrate 52. Each stationary comb drive 96 is substantially similar to stationary comb drive 81 described above and has a radially-extending truss or bar 101 having opposite first and second end portions 101a and 101b. A plurality of first comb drive fingers or stationary comb fingers 102 extend from one side of stationary bar 101 in radially spaced-apart positions along the length of the bar. Movable comb drive 97 is substantially similar to movable comb drive 82 described above and is formed from a radially-extending truss or bar 103 having opposite first and second end portions 103a and 103b. A plurality of second comb drive fingers or movable comb fingers 104 extend from one side of bar 103 in radially spaced-apart positions along the length of the bar.

Movable bar 91 of first comb drive assembly 58a and movable bar 103 of second comb drive assembly 59a are joined back-to-back to each other so that the respective movable comb fingers 92 and 104 thereof extend in opposite angular directions along the length of the joined bars 91 and 103. Second end portion 91b of the movable bar 91 and second end portion 103b of the movable bar 103 are joined to first extremity 53a of movable member 53. Movable bar 91 of first comb drive assembly 58b and movable bar 103 of second comb drive assembly 59b are joined back-to-back to each other to form a combined bar. Second end portion 91b of the first comb drive assembly 58b and second end portion 103b of the second comb drive assembly 59b are joined to second extremity 53b of the movable member 53. Stationary comb fingers 87 and 102 and movable comb fingers 92 and 104 can be of any suitable type, however it is preferable that the comb fingers be offset and/or inclined as described in U.S. patent application Ser. No. 09/727,794 filed Nov. 29, 2000, now U.S. Pat. No. 6,469,415, the entire content of which is incorporated herein by this reference.

Movable comb drives 82 of first comb drive assemblies 58a and 58b are each movable in an angular direction of travel, and hence rotate, about the axis of rotation of microactuator 51 between a first or rest position shown in FIG. 4, in which movable comb fingers 92 are not substantially fully interdigitated with respect to stationary comb fingers 87, to a second or actuated position shown in FIG. 6, in which movable and stationary comb fingers 92 and 87 are substantially fully interdigitated. Similarly, movable comb drives 97 of second comb drive assemblies 59a and 59b are movable in an opposite angular direction of travel about such axis of rotation between a first or rest position shown in FIG. 4, in which movable comb fingers 104 are not substantially filly interdigitated with stationary comb fingers 102, to a second or actuated position shown in FIG. 7, in which movable and stationary comb fingers 104 and 102 are substantially fully interdigitated.

Each movable comb drive 82 of first comb drive assemblies 58a and 58b is in its second position when each movable comb drive 97 of the second comb drive assemblies 59a and 59b is in a third position (see FIG. 6), in which movable comb fingers 104 are more fully spaced apart and disengaged from stationary comb fingers 102 than when the movable comb fingers are in their first position. Similarly, movable comb drives 97 of the second comb drive assemblies 59a and 59b move to their second positions when the movable comb drives 82 of first and second comb drive assemblies 58a and 58b move to a third position (see FIG.

7), in which movable comb fingers 92 are more fully spaced apart and disengaged from stationary comb fingers 87 than when the movable comb fingers are in their first position.

Electrical means is included for driving movable comb drives 82 of first comb drive assemblies 58a and 58b and movable comb drives 97 of second comb drive assemblies 59a and 59b between their respective first and second positions. Such electrical means can include a controller and voltage generator 106 electrically connected to a plurality of provided on substrate 52 electrodes (not shown) by means of a plurality of electrical leads. Such electrodes include a ground or common electrode electrically coupled to first suspension member 56 or second suspension member 57 so as to be electrically connected to movable comb drives 82 and 97. A first drive electrode (not shown) is electrically coupled to each of the stationary comb drives 81 of first comb drive assemblies 58a and 58b and a second drive electrode (not shown) is electrically coupled to each of the stationary comb drives 96 of second comb drive assemblies 59a and 59b. For simplicity in the drawings, controller is shown only in FIG. 4 where common lead 107 thereon extends from controller 106 to first anchor 71, first drive lead 108 extends from the controller to each of first stationary comb drives 81 and second drive lead 109 extends from the controller to each of second stationary comb drives 96.

Controller and voltage generator 106 is typically not an integral part of microactuator 51. Means in the form of a closed loop servo control such as in the type disclosed in U.S. patent application Ser. No. 09/728,212 filed Nov. 29, 2000, the entire contents of which is incorporated herein by this reference, can be included for monitoring the position of movable comb drives 82 and 97 and, thus, movable member 53.

In operation and use, first and second suspension members 56 and 57 permit movable member 53 to rotate about the axis of rotation of microactuator 51 between the first actuated position of FIG. 6 and the second actuated position of FIG. 7. The bendable first and second end portions of suspension members 56 and 57 permit the suspension members to bend relative to respective anchors 71 and 72 and thus substrate 26 so as to allow such angular movement of movable member 53. As discussed above with respect to miniature device 21, there is a small parasitic motion in movable member 53 in the direction perpendicular to the angular movement of the member 53 caused by first and second suspension members 56 and 57 remaining essentially the same length as they are bent.

The substantially rigid central portion of first and second suspension members 56 and 57 causes the parasitic side motion of such suspension members to be advantageously smaller than the parasitic side motion in a suspension member of a rotatable miniature device having a constant width over the length of the suspension member. The determination of the rotary or bending stiffness and stress of first and second suspension members 56 and 57 is determined in the same manner as discussed above with respect to suspension members 23 and 24 of miniature device 21. The analysis set forth above for miniature device 21 represents the special case in which θ=0° and r=∞. The amount of bending at the moving ends of suspension members 56 and 57 depends on r; as the value of r is reduced the bending at the moving end portions 56b and 57b of the suspension members is also reduced.

Figure 9:
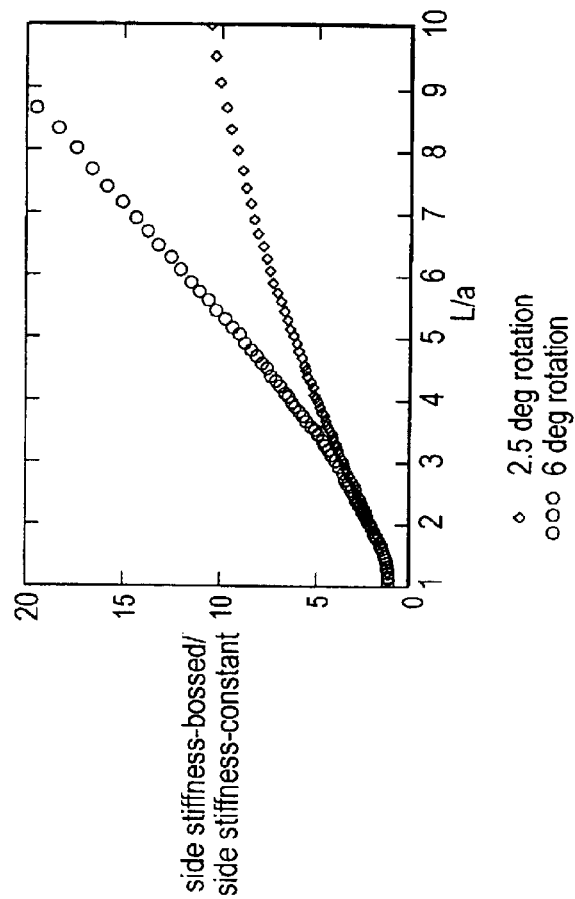
FIG. 9 is a graph showing the ratio of side stiffness for a bossed suspension member over a constant width suspension member as a function of the boss ratio of the bossed suspension member for the miniature device of FIG. 4.

FIG. 9 is similar to FIG. 2 and compares the increase in side stiffness for a single bossed suspension member of a rotatable miniature device such as microactuator 51 over a single constant width suspension member of equal length and rotary stiffness for different boss ratios and different angular deflections ranges of the bossed suspension member and thus movable member 53. The constant width suspension member utilized for the comparisons of FIG. 9 has a constant width of five microns and a length of 1200 microns. Hence, $w_a=W=5$ microns and L=1200 microns. The constant width of such suspension member dictates that $W/w_a=L/a=1$. The constant width suspension member further has r=0, θ=90°, and a rotary stiffness of 0.01 N-um/deg. The bossed suspension member utilized in the comparison of FIG. 9 is similarly dimensioned except that width W equals 12 microns and width $w_a$ equals four microns. The width ratio $W/w_a$ of such bossed suspension member is thus equal to three. These dimensions were chosen so that for purposes of comparison in FIG. 9 the rotary stiffness of such constant width suspension member is equivalent to the rotary stiffness of such bossed suspension member. FIG. 9 shows that a rotary bossed suspension, such as suspension members 56 and 57, having a boss ratio of five has a side stiffness improved by a factor of 6 after a 2.5° rotation and improved by a factor of 10 after a 6° rotation. The increase in side stiffness of the rotary suspension member increases the angular range of movable member 53.

The stress increase in a rotary suspension is essentially the same as shown in FIG. 3 for a linear suspension.

As the bending at the moving end of a rotary bossed suspension member is reduced relative to the bending at the fixed end, the optimal location of the bossed central portion of the suspension member moves toward the moving end portion of the suspension member. The optimal location of the center of the bossed central portion of the suspension member ranges from 50% of the length of the suspension member for the special case of miniature device 21 in which θ=0° and r=∞ to 56% of the length of the suspension member for the case of microactuator 51 in which θ=90° and r=0.

As disclosed in the foregoing discussion regarding miniature device 21 and rotatable microactuator 51, a boss ratio of between 3 and 6 for an electrostatic actuator represents a good compromise between increased side stiffness, reduced compliance and increased maximum stiffness. In the two extreme cases where the movable portion of the miniature device either purely translates for purely rotates, the optimal boss ratio is preferably approximately five for a typical suspension member. With such a boss ratio, the side stiffness of the suspension member is improved by a factor of ten while the stress is increased only by approximately 60%.

For simplicity, the analysis herein shows the width of the bossed suspension member varying in discrete steps. In practice, however, it may be useful to minimize stress concentration in the sharp corners at the junction of the end portions and the central portion of the suspension member and at connections to the substrate by providing a filet at those locations. In addition, it is also possible to make a bossed suspension member with a continuously or otherwise varying width along its length.

Although electrostatic microactuator 51 is shown and described as a rotatable electrostatic microactuator that has the shape of a truncated sector of a circle, it should be appreciated that the invention is broad enough to cover any suitable linear, rotatable or other actuator.

As can be seen from the foregoing, a miniature device having a suspension member for supporting a movable member over a substrate has been provided. The suspension has a high compliance in the desired direction of motion, a high side stiffness and a minimal device area. The miniature device is capable of translating an optical element.

What is claimed is:

1. A miniature device comprising a substrate, a movable member overlying the substrate and first and second spaced-apart suspension members, each of the first and second suspension members having a first bendable end portion coupled to the substrate and a second bendable end portion coupled to the movable member and a substantially rigid central portion intermediate the first and second end portions.

2. The miniature device of claim 1 wherein the first and second bendable end portions of each suspension member have respective first and second lengths and the suspension member has an overall length, the sum of the first and second lengths of each suspension member ranging from 5% to 40% of the overall length of the suspension member.

3. The miniature device of claim 2 wherein the sum of the first and second lengths ranges from 15% to 30% of the overall length.

4. The miniature device of claim 3 wherein the sum of the first and second lengths is approximately 20% of the overall length.

5. The miniature device of claim 2 wherein the first and second suspension members extend substantially parallel to each other when in a rest position and wherein the movable member substantially translates between first and second positions.

6. The miniature device of claim 2 wherein the first and second suspension members extend at an angle to each other when in a rest position and wherein the movable member pivots about an axis of rotation between first and second positions.

7. The miniature device of claim 1 wherein the first and second bendable end portions of each suspension member has a first constant width and the central portion has a second constant width greater than the first constant width.

8. The miniature device of claim 1 wherein the movable member includes a comb drive member.

9. The miniature device of claim 8 further comprising an additional comb drive member mounted on the substrate, each of the first-named comb drive member and the additional comb drive member having respective comb drive fingers, the first-named comb drive member being movable from a first position to a second position in which the comb drive fingers of the first-named comb drive member become substantially interdigitated with the comb drive fingers of the additional comb drive member, each of the first and second bendable end portions having a width and the central portion having a width that is greater than the width of each of the first and second bendable end portions.

10. The miniature device of claim 9 wherein the first-named comb drive member moves in a linear direction from the first position to the second position.

11. The miniature device of claim 9 wherein the first-named comb drive member rotates about a pivot axis from the first position to the second position.

12. A miniature device comprising a substantially planar substrate, a movable member overlying the substrate and first and second spaced-apart suspension members, each of the first and second suspension members having a first end portion coupled to the substrate and a second end portion coupled to the movable member for permitting the movable member to move in a plane parallel to the substrate, the first and second end portions of each of the first and second suspension members being bendable in the plane, each of the first and second suspension members having a central portion intermediate the first and second end portions which is substantially nonbendable in the plane.

13. The miniature device of claim 12 wherein the first and second end portions of each suspension member have respective first and second lengths and the suspension member has an overall length, the sum of the first and second lengths of each suspension member ranging from 5% to 40% of the overall length of the suspension member.

14. The miniature device of claim 12 wherein the first and second end portions of each suspension member has a first constant width and the central portion has a second constant width greater than the first constant width.

15. A miniature device comprising a substrate, a movable member overlying the substrate and first and second spaced-apart suspension members, each of the first and second suspension members having a first end portion coupled to the substrate and a second end portion coupled to the movable member and a central portion intermediate the first and second end portions, a first comb drive overlying the substrate and coupled to the movable member and a second comb drive mounted on the substrate, the first comb drive being movable from a first position to a second position relative to the second comb drive, the first and second end portions of each suspension member having a first constant width and the central portion having a second constant width greater than the first constant width for inhibiting bending of the central portion.

16. The miniature device of claim 15 wherein the first and second end portions of each suspension member have respective first and second lengths and the suspension member has an overall length, the sum of the first and second lengths of each suspension member ranging from 5% to 40% of the overall length of the suspension member.

17. The miniature device of claim 16 wherein the sum of the first and second lengths ranges from 15% to 30% of the overall length.

18. The miniature device of claim 17 wherein the sum of the first and second lengths is approximately 20% of the overall length.

* * * * *